US011610405B2

(12) United States Patent
Petrey, Jr.

(10) Patent No.: US 11,610,405 B2
(45) Date of Patent: *Mar. 21, 2023

(54) SYSTEM AND METHOD FOR CORRELATING ELECTRONIC DEVICE IDENTIFIERS AND VEHICLE INFORMATION

(71) Applicant: William Holloway Petrey, Jr., Frisco, TX (US)

(72) Inventor: William Holloway Petrey, Jr., Frisco, TX (US)

(73) Assignee: William Holloway Petrey, Jr., Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,734

(22) Filed: May 3, 2022

(65) Prior Publication Data

US 2022/0262124 A1 Aug. 18, 2022

Related U.S. Application Data

(63) Continuation of application No. 17/688,340, filed on Mar. 7, 2022, which is a continuation of application
(Continued)

(51) Int. Cl.
*G06V 20/54* (2022.01)
*G06V 20/62* (2022.01)
(Continued)

(52) U.S. Cl.
CPC .............. *G06V 20/54* (2022.01); *G06V 20/63* (2022.01); *G06V 40/161* (2022.01); *G08B 7/06* (2013.01); *G06V 20/625* (2022.01); *G08B 25/10* (2013.01)

(58) Field of Classification Search
CPC .......... G06K 9/00785; G06K 9/00228; G06K 9/3258; G06K 2209/15; G08B 7/06; G08B 25/10
See application file for complete search history.

(56) References Cited

U.S. PATENT DOCUMENTS 8,384,542 B1 2/2013 Merrill et al.
9,792,434 B1 10/2017 Li et al.
(Continued)

OTHER PUBLICATIONS

International Searching Authority, Search Report and Written Opinion for International Application No. PCT/US20/39375, dated Sep. 18, 2020; 8 pages.
(Continued)

*Primary Examiner* — David F Dunphy
(74) *Attorney, Agent, or Firm* — Dickinson Wright PLLC; Stephen A. Mason; Jonathan H. Harder

(57) ABSTRACT

A system for monitoring vehicle traffic may include a camera positioned to capture images within a license plate detection zone, the images may represent license plates of vehicles. The system may include an electronic device identification sensor that detects and stores electronic device identifiers of electronic devices located within an electronic device detection zone, and a computing system that detects, using the images, a license plate ID of a vehicle, compare the license plate ID of the vehicle to a database of trusted vehicle license plate IDs, identifies the vehicle as a suspicious vehicle, the identification based at least in part on the comparison of the license plate ID of the vehicle to the database of trusted vehicle license plate IDs, and correlates the license plate ID of the vehicle with at least one of the plurality of stored electronic device identifiers.

20 Claims, 6 Drawing Sheets

Related U.S. Application Data

No. 16/910,949, filed on Jun. 24, 2020, now Pat. No. 11,270,129.

(60) Provisional application No. 62/866,278, filed on Jun. 25, 2019.

(51) Int. Cl.
*G06V 40/16* (2022.01)
*G08B 7/06* (2006.01)
*G08B 25/10* (2006.01)

(56) References Cited

U.S. PATENT DOCUMENTS

| | | | |
|---|---|---|---|
| 11,270,129 B2* | 3/2022 | Petrey, Jr. | ............. G06V 20/63 |
| 2012/0147190 A1 | 6/2012 | Loli | |
| 2014/0334684 A1 | 11/2014 | Strimling | |
| 2017/0293847 A1 | 10/2017 | Robertson et al. | |
| 2018/0069937 A1 | 3/2018 | Koller | |
| 2018/0102032 A1 | 4/2018 | Emmanuel et al. | |
| 2019/0088096 A1 | 3/2019 | King et al. | |
| 2019/0108735 A1 | 4/2019 | Xu | |
| 2020/0117900 A1 | 4/2020 | Deng et al. | |
| 2020/0162701 A1 | 5/2020 | Nixon et al. | |
| 2020/0320573 A1 | 10/2020 | Harrison | |
| 2020/0327315 A1 | 10/2020 | Mullins | |
| 2020/0344203 A1 | 10/2020 | Mermoud et al. | |

OTHER PUBLICATIONS

International Searching Authority, Search Report and Written Opinion for International Application No. PCT/US20/53816, dated Jan. 26, 2021; 7 pages.

* cited by examiner

300 

Capture, using at least one camera, a set of images within a license plate detection zone, at least some of the set of images representing license plates of a set of vehicles appearing within the camera's field of view
302

Detect and store, using an electronic device identification sensor, a set of electronic device identifiers of electronic devices located within one or more electronic device detection zones
304

Detect, using the set of images, a license plate ID of a vehicle
306

Compare the license plate ID of the vehicle to a database of trusted vehicle license plate IDs
308

Identify the vehicle as a suspicious vehicle, the identification based at least in part on the comparison of the license plate ID of the vehicle to the database of trusted vehicle license plate IDs
310

Correlate the license plate ID of the vehicle with at least one of the set of stored electronic device identifiers
312

*FIG. 3*

SYSTEM AND METHOD FOR CORRELATING ELECTRONIC DEVICE IDENTIFIERS AND VEHICLE INFORMATION

CROSS-REFERENCES TO RELATED APPLICATIONS

This application is a continuation of U.S. application patent Ser. No. 17/688,340 filed Mar. 7, 2022 titled "System and Method for Correlating Electronic Device Identifiers and Vehicle Information" which is a continuation of U.S. patent application Ser. No. 16/910,949 filed Jun. 24, 2020 (U.S. Pat. No. 11,270,129) titled "System and Method for Correlating Electronic Device Identifiers and Vehicle Information" which claims priority to and the benefit of U.S. Provisional Application Patent Ser. No. 62/866,278 filed Jun. 25, 2019, the entire disclosures of which are hereby incorporated by reference.

TECHNICAL FIELD

This disclosure relates generally to information correlation. More specifically, this disclosure relates to a system and method for correlating electronic device identifiers and vehicle information.

BACKGROUND

Many public and private areas, including airports, business parks, companies, border checkpoints, neighborhoods, etc. employ measures to enhance the safety of the people and property on the area premises. For example, some neighborhoods are gated and visitors to the communities may be forced to check-in with a guard at a security gate prior to being allowed into the neighborhood. Some neighborhoods employ a crime watch group that includes a group of concerned citizens who work together with law enforcement to help keep their neighborhood safe. Such a program may rely on volunteers to patrol the neighborhood to help law enforcement discover and/or thwart suspicious and/or criminal activity. However, these and other conventional measures lack the ability to correlate certain information that provides for enhanced identification, tracking, and notification of and/or to suspicious vehicles/individuals.

SUMMARY

In general, the present disclosure provides a system and method for correlating wireless network information.

In one aspect, a system for monitoring vehicle traffic may include at least one camera positioned to capture a set of images within a license plate detection zone, at least some of the captured images representing license plates of a set of vehicles appearing within the camera's field of view. The system may also include at least one electronic device identification sensor configured to detect and store a set of electronic device identifiers of electronic devices located within one or more electronic device detection zones. The system may also include one or more non-transitory computer-readable storage media having stored thereon computer-executable instructions that, when executed by one or more processors, cause a computing system to: detect, using the set of images, a license plate ID of a vehicle; compare the license plate ID of the vehicle to a database of trusted vehicle license plate IDs; identify the vehicle as a suspicious vehicle, the identification based at least in part on the comparison of the license plate ID of the vehicle to the database of trusted vehicle license plate IDs; and correlate the license plate ID of the vehicle with at least one of the set of stored electronic device identifiers.

In another aspect, a method may include capturing, using at least one camera, a set of images within a license plate detection zone, at least some of the set of images representing license plates of a set of vehicles appearing within the camera's field of view. The method may also include detecting and storing, using an electronic device identification sensor, a set of electronic device identifiers of electronic devices located within one or more electronic device detection zones. The method may also include detecting, using the set of images, a license plate ID of a vehicle. The method may also include comparing the license plate ID of the vehicle to a database of trusted vehicle license plate IDs, and identifying the vehicle as a suspicious vehicle, the identification based at least in part on the comparison of the license plate ID of the vehicle to the database of trusted vehicle license plate IDs. The method may also include correlating the license plate ID of the vehicle with at least one of the set of stored electronic device identifiers.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

It should be noted that the term "cellular media access control (MAC) address" may refer to a MAC, international mobile subscriber identity (IMSI), mobile station international subscriber directory number (MSISDN), enhanced network selection (ENS), or any other form of unique identifying number.

BRIEF DESCRIPTION OF THE DRAWINGS

For a more complete understanding of this disclosure and its advantages, reference is now made to the following description, taken in conjunction with the accompanying drawings, in which:

FIG. 3 illustrates example method for monitoring vehicle traffic, according to certain embodiments of this disclosure;

DETAILED DESCRIPTION

Figure 1:
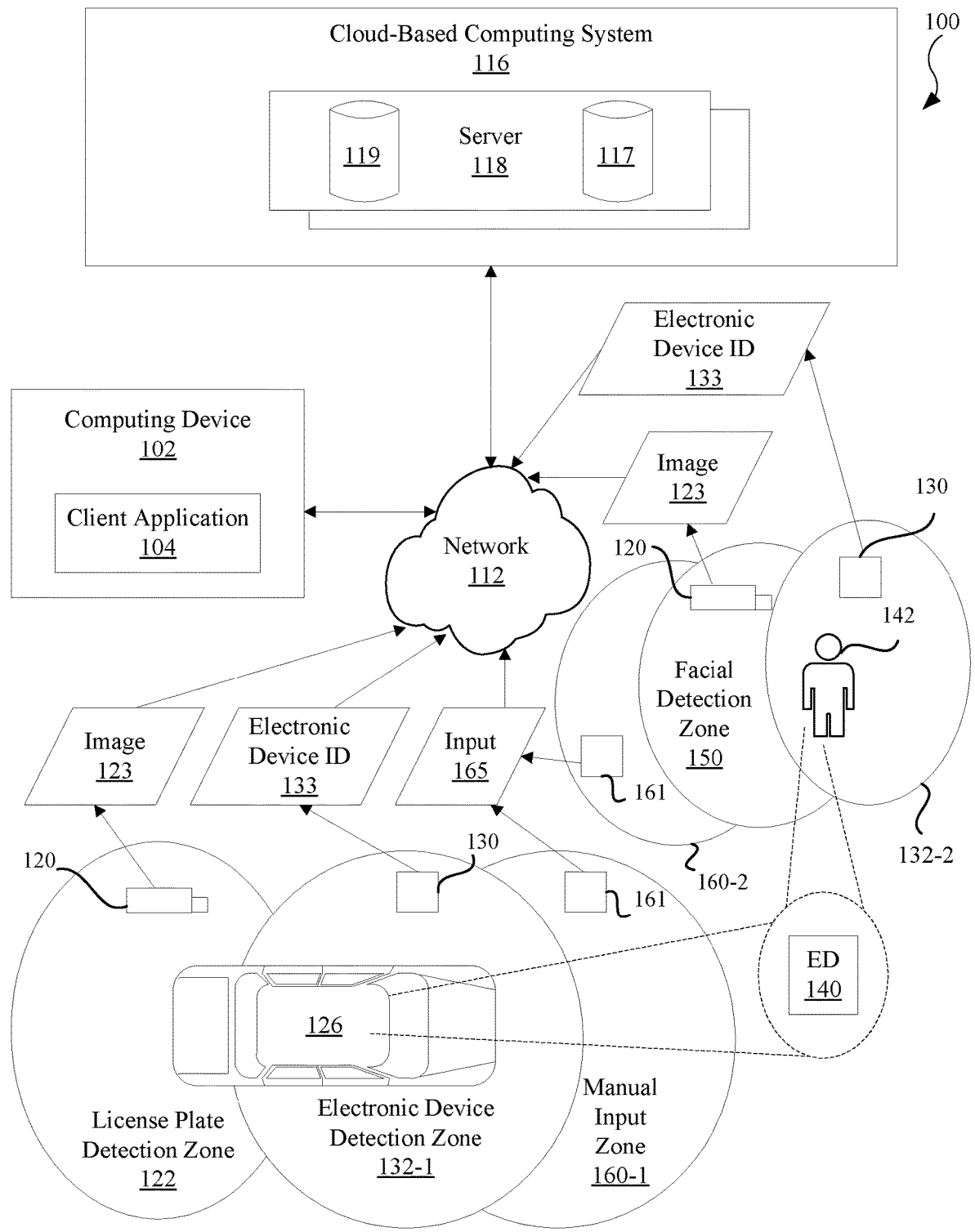
FIG. 1 illustrates a high-level component diagram of an illustrative system architecture, according to certain embodiments of this disclosure.

Improvement is desired in the field of public safety for certain areas (e.g., neighborhood, airport, business park, border checkpoint, city, etc.). As discussed above, there are various measures that may be conventionally used, such as gated communities, neighborhood crime watch groups, and so forth. However, the conventional measures lack efficiency and accuracy in identifying suspicious vehicles/individuals and reporting of the suspicious vehicles/individuals, among other things. In some instances, the conventional measures may fail to report the suspicious vehicle/individual, altogether. The causes of the inefficient and/or failed reporting may be at least in part attributable to people (e.g., neighbors in a neighborhood) not having access to verified vehicle and/or personal information of an individual. Further, the conventional measures lack the ability to quickly, accurately, and automatically identify the vehicle as a suspicious vehicle, correlate vehicle information (e.g., license plate identifier (ID)), electronic device information (e.g., electronic device identifier (ID)), face information, etc., and/or perform a preventative action based on the identification.

Take the following example for illustrative purposes. A neighbor may witness an unknown vehicle drive through the neighborhood several times within a given time period during a day. The neighbor may not recognize the license plate ID or driver and may think about reporting the unknown vehicle to law enforcement. Instead, the neighbor may decide to proceed to do another activity. Subsequently, the person may burglarize a house in the neighborhood. Even if the neighbor attempted to lookup the license plate ID, and was able to find out information about an owner of the vehicle, the neighbor may not be able to determine whether the driver of the vehicle is the actual owner, the neighbor may not be able to determine whether the owner or driver is on a crime watch list, and so forth. Further, the neighbor may not be privy to the electronic device identifier of the electronic device the suspicious individual is carrying or that is installed in the vehicle, which may be used to track the whereabouts of the individual/vehicle in a monitored area. Even if a neighbor obtains an electronic device identifier, there currently is no technique for determining personal information associated with the electronic device identifier. To reiterate, conventional techniques for public safety lack the ability to identify a suspicious vehicle/individual and/or to correlate vehicle information, facial information, and/or electronic device identifiers of electronic devices of the driver to make an informed decision quickly, accurately, and automatically.

Aspects of the present disclosure relate to embodiments that overcome the shortcomings described above. The present disclosure relates to a system and method for correlating electronic device identifiers with vehicle information. The system may include one or more license plate detection zones, one or more electronic device detection zones, and/or one or more facial detection zones. The zones may be partially or wholly overlapping and there may be multiple zones established that span a desired area (e.g., a neighborhood, a city block, a public/private parking lot, any street, etc.). The license plate detection zones, the electronic device detection zones, and/or the facial detection zones may include devices that are communicatively coupled to one or more computing systems via a network. The license plate detection zones may include one or more cameras configured to capture images of at least license plates on vehicles that enter the license plate detection zone. The electronic device detection zone may include one or more electronic device identification sensors, such as a WiFi signal detection device or a Bluetooth® signal detection device. The electronic device identification sensors may be configured to detect and store WiFi Machine Access Control (MAC) addresses, Bluetooth MAC addresses, and/or cellular MAC addresses (e.g., International Mobile Subscriber Identity (IMSI), Mobile Station International Subscriber Directory Number (MSISDN), and Electronic Serial Numbers (ESN)) of electronic devices that enter the electronic device detection zone based on the signals emitted by the electronic devices. The facial detection zones may include one or more cameras configured to capture images or digital frames that are used to recognize a face. Any suitable MAC address may be detected, and to that end, a MAC address may be any combination of the IDs described herein (e.g., MAC, MSISDN, IMSI, ESN, etc.).

The computing system may analyze the images captured by the cameras and detect a license plate identifier (ID) of a vehicle. The license plate ID may be compared with trusted license plate IDs that are stored in a database. When there is not a trusted license plate ID that matches the license plate ID, the computing system may identify the vehicle as a suspicious vehicle. Then, the computing system may correlate the license plate ID of the vehicle with at least one of the stored electronic device identifiers. In some embodiments, the license plate ID and the at least one of the stored electronic device identifiers may be correlated with a face of the individual. In some embodiments, personal information, such as name, address, Bluetooth MAC address, WiFi MAC address, criminal record, whether the suspicious individual is on a crime watch list, etc. may be retrieved using the license plate ID or the at least one of the stored electronic device identifiers that is correlated with the license plate ID of the suspicious vehicle.

The system may include several computer applications that may be accessed by registered users of the system. For example, a client application may be accessed by a computing device of a user, such as a neighbor in a neighborhood implementing the system. The client application may present a user interface including an alert when a suspicious vehicle and/or individual is detected. The user interface may present several preventative actions for the user. For example, the user may contact the suspicious individual using the personal information (e.g., send a threatening text message), notify law enforcement, and so forth. Accordingly, a client application may be accessed by a computing device of a law enforcer. The client application may present a user interface including the notification that a suspicious vehicle and/or individual is detected in the particular zones.

Take the following example of a setup of the system for illustration purposes. In a neighborhood, that may only be accessed by two entrances, license plate detection zones and electronic device detection zones may be placed to cover both lanes at both entrances. In some instances, a facial detection zone may be placed at the entrances with the other zones. Each vehicle may be correlated with each electronic device that enters the neighborhood. Further, the recognized face may be correlated with the electronic device and the vehicle information. The houses inside the neighborhood may setup electronic device detection zones and/or a facial detection zone inside their property to detect electronic device IDs and/or faces and compare them with electronic device IDs and/or faces in a database that stores every correlation that has been made by the system to date (including the most recent correlations of electronic device IDs, faces, and/or vehicles entering the neighborhood). The home owner may be notified via the client application on their computing device if an electronic device and/or face is detected on their property. Further, in some embodiments, the individual associated with the electronic device and/or face may be notified on the electronic device that the homeowner is aware of their presence. If a known criminal with a warrant is detected at either the zones at the entrance or at the zones at the homeowner's property, the appropriate law enforcement agency may be notified of their whereabouts.

The disclosed techniques provide numerous benefits over conventional systems. For example, the system provides efficient, accurate, and automatic identification of suspicious vehicles and/or individuals. Further, the system enables correlating vehicle license plate IDs with electronic device identifiers to enable enhanced detection and/or preventative actions, such as directly communicating with the electronic device of the suspicious individual and/or notifying law enforcement using the client application in real-time or near real-time when the suspicious vehicle enters one or more zones. For example, once the electronic device identifier is detected, a correlation may be obtained with a license plate ID to obtain personal information about the owner that enables contacting the owner directly and/or determining whether the owner is a criminal. The client application provides pertinent information pertaining to both the suspicious vehicle and/or individual in a single user interface without the user having to perform any searches of the license plate ID or electronic device identifier. As such, in some embodiments, the disclosed techniques reduce processing, memory, and/or network resources by reducing searches that the user may perform to find the information. Also, the disclosed techniques provide an enhanced user interface that presents the suspicious vehicle and/or individual information in single location, which may improve a user's experience using the computing device.

FIGS. 1 through 6, discussed below, and the various embodiments used to describe the principles of this disclosure are by way of illustration only and should not be construed in any way to limit the scope of the disclosure.

FIG. 1 illustrates a high-level component diagram of an illustrative system architecture 100 according to certain embodiments of this disclosure. In some embodiments, the system architecture 100 may include a computing device 102 communicatively coupled to a cloud-based computing system 116, one or more cameras 120, one or more electronic device identification sensors 130, and/or one or more electronic device 140 of a suspicious individual. The cloud-based computing system 116 may include one or more servers 118. Each of the computing device 102, the servers 118, the cameras 120, the electronic device identification sensors 130, and the electronic device 140 may include one or more processing devices, memory devices, and network interface devices.

The network interface devices may enable communication via a wireless protocol for transmitting data over short distances, such as Bluetooth, ZigBee, etc. Additionally, the network interface devices may enable communicating data over long distances, and in one example, the computing device 102 may communicate with a network 112. Network 112 may be a public network (e.g., connected to the Internet via wired (Ethernet) or wireless (WiFi)), a private network (e.g., a local area network (LAN) or wide area network (WAN)), or a combination thereof.

The computing device 102 may be any suitable computing device, such as a laptop, tablet, smartphone, or computer. The computing device may be configured to execute a client application 104 that presents a user interface. The client application 104 may be implemented in computer instructions stored on one or more memory devices and executed by one or more processing devices of the computing device 102. The client application 104 may be a standalone application installed on the computing device 102 or may be an application that is executed by another application (e.g., a website in a web browser).

The computing device 102 may include a display that is capable of presenting the user interface of the client application 104. The user interface may present various screens to a user depending on what type of user is logged into the client application 104. For example, a user, such as a neighbor or person interested in a particular license plate detection zone 122 and/or electronic device detection zone 132, may be presented with a user interface for logging into the system where the user enters credentials (username and password), a user interface that displays alerts of suspicious vehicles and/or individuals in the zones 122 and/or 132 where the user interface includes options for preventative actions, a user interface that presents logged events over time, and so forth. For example, the client application 104 may enable the user to directly contact (e.g., send text message, send email, call) the electronic device 140 of a suspicious individual 142 using personal information obtained about the individual 142. Another user, such as a law enforcer, may be presented with a user interface for logging into the system where the user enters credentials (username and password), a user interface that displays notifications when the user selects to notify law enforcement where the notifications may include information related to the suspicious vehicle and/or individual 142.

In some embodiments, the cameras 120 may be located in the license plate detection zones 122. Although just one camera 120 and one license plate detection zone 122 are depicted, it should be noted that any suitable number of cameras 120 may be located in any suitable number of license plate detection zones 122. For example, multiple license plate detection zones 122 may be used to cover a desired area. A license plate detection zone 122 may refer to an area of coverage that is within the cameras' 120 field of view. The cameras 120 may be any suitable camera and/or video camera capable of capturing a set of images 123 that at least represent license plates of a vehicle 126 that enters the license plate detection zone 122. The set of images 123 may be transmitted by the camera 120 to the cloud-based computing system 116 and/or the computing device 102 via the network 112.

In some embodiments, the electronic device identification sensors 130 may be located in the electronic device detection zones 132. In some embodiments, the license plate detection zone 122 and the electronic device detection zone 132-1 may partially or wholly overlap. The combination of license plate detection zones 122 and the electronic device detection zones 132 may be setup at entrances/exits to certain areas, and/or any other suitable area in a monitored area, to correlate each vehicle information with respective electronic device identifiers 133 of electronic devices 140 being carried in respective vehicles 126. Each of the license plate detection zones 122 and electronic device detection zones 132 may have unique geographic identifiers so the data can be tracked by location. It should be noted that any suitable number of electronic device identification sensors 130 may be located in any suitable number of electronic device detection zones 132. For example, multiple electronic device detection zones 132 may be used to cover a desired area. An electronic device detection zone 132 may refer to an area of coverage that is within the electronic device identification sensor 130 detection area.

In one example, an electronic device detection zone 132-2 and/or a facial detection zone 150 may be setup at a home of a homeowner, such that an electronic device 140 and/or a face of a suspicious individual 142 may be detected and stored when the suspicious individual 142 enters the zone 132-2. The electronic device ID 133 and/or an image of the face may be transmitted to the cloud-based computing device 116 or the computing device 102 via the network 112. In some instances, the suspicious individual 142 may be contacted on their electronic device 140 with a message indicating the homeowner is aware of their presence and to leave the premises. In some instances, if a known criminal individual 142 with a warrant is detected at the combination of zones 122 and 132-1 at an entrance or at the zone 132-2 and 150 at the home, then the proper law enforcement agency may be contacted with the whereabouts of the individual 142.

In some embodiments, the cameras 120 may be located in the facial detection zones 150. Although just one camera 120 and one facial detection zone 150 are depicted, it should be noted that any suitable number of cameras 120 may be located in any suitable number of facial detection zones 122. For example, multiple facial detection zones 150 may be used to cover a desired area. A facial detection zone 150 may refer to an area of coverage that is within the cameras' 120 field of view. The cameras 120 may be any suitable camera and/or video camera capable of capturing a set of images 123 that at least represent faces of an individual 142 that enters the facial detection zone 150. The set of images 123 may be transmitted by the camera 120 to the cloud-based computing system 116 and/or the computing device 102 via the network 112. In some embodiments, the cloud-based computing system 116 and/or the computing device 102 may perform facial recognition by comparing a face detected in the image to a database of faces to find a match and/or perform biometric artificial intelligence that may uniquely identify an individual 142 by analyzing patterns based on the individual's facial textures and shape.

The electronic device identification sensors 130 may be configured to detect a set of electronic device IDs 133 (e.g., WiFi MAC addresses, Bluetooth MAC addresses, and/or cellular MAC addresses) of electronic device 140 within the electronic device detection zone 132. As depicted, the electronic device 140 of a suspicious individual is within the vehicle 126 passing through the electronic device detection zone 132. That is, the electronic device identification sensors 130 may be any suitable WiFi signal detection device capable of detecting WiFi MAC addresses and/or Bluetooth signal detection device capable of detecting Bluetooth MAC addresses of electronic devices 140 that enter the electronic device detection zone 132. The set of images 123 may be transmitted by the camera 120 to the cloud-based computing system 116 and/or the computing device 102 via the network 112. The electronic device identification sensor 130 may store the set of electronic device IDs 133 locally in a memory. The electronic device identification sensor 130 may also transmit the set of electronic device IDs 133 to the cloud-based computing system 116 and/or the computing device 102 via the network 112 for storage.

As noted above, the cloud-based computing system 116 may include the one or more servers 118 that form a distributed computing architecture. Each of the servers 118 may be any suitable computing system and may include one or more processing devices, memory devices, data storage, and/or network interface devices. The servers 118 may be in communication with one another via any suitable communication protocol. The servers 118 may each include at least one trusted vehicle license plate IDs database 117 and at least one personal identification database 119. In some embodiments, the databases 117 and 119 may be stored on the computing device 102.

The trusted vehicle license plate IDs database 117 may be populated by a processing device adding license plate IDs of vehicles that commonly enter the license plate detection zone 122. In some embodiments, the trusted vehicle license plate IDs database 117 may be populated at least in part by manual entry of license plate IDs associated with vehicles trusted to be within the license plate detection zone 122. These license plate IDs may be associated with vehicles owned by neighbors in a neighborhood, or family members of the neighbors, friends of the neighbors, visitors of the neighbors, contractors hired by the neighbors, any suitable person that is trusted, etc.

The personal identification database 119 may be populated by a processing device adding personal identification information associated with electronic device IDs 133 of electronic devices carried by people that commonly enter the electronic device detection zone 132 (e.g., a list of trusted electronic device IDs). In some embodiments, the personal identification database 119 may be populated at least in part by manual entry of personal identification information associated with electronic device IDs 133 associated with electronic devices 140 trusted to be within the electronic device detection zone 132 (e.g., a list of trusted electronic device IDs). These electronic device IDs 133 may be associated with electronic devices 140 owned by neighbors in a neighborhood, or family members of the neighbors, friends of the neighbors, visitors of the neighbors, contractors hired by the neighbors, etc. Further, in some embodiments, the personal identification database 119 may be populated by entering a list of known suspect individuals from the police department, people entering or exiting border checkpoints, etc.

The personal identification information for untrusted electronic device IDs may also be entered into the personal identification database 119. The personal identification database 119 may also be populated by a processing device adding personal identification information associated with electronic device IDs 133 of electronic devices carried by people that commonly enter the facial detection zone 132 (e.g., face images of trusted individuals). The personal identification information may include names, addresses, faces, email addresses, phone numbers, electronic device identifiers associated with electronic devices owned by the people (e.g., Bluetooth MAC addresses, WiFi MAC addresses), correlated license plate IDs with the electronic device identifiers, etc. The correlations between the license plate IDs, the electronic device identifiers, and/or the faces may be performed by a processing device using the data obtained from the cameras 120 and the electronic device identification sensors 130. Some of this information may be obtained from public sources, phone books, the Internet, and/or companies that distribute electronic devices. In some embodiments, the personal identification information added to the personal identification database 119 may be associated with people selected based on their residing in or near a certain radius of a geographic region where the zones 122 and/or 132 are set up, based on whether they are on a crime watch list, or the like.

Figure 2:
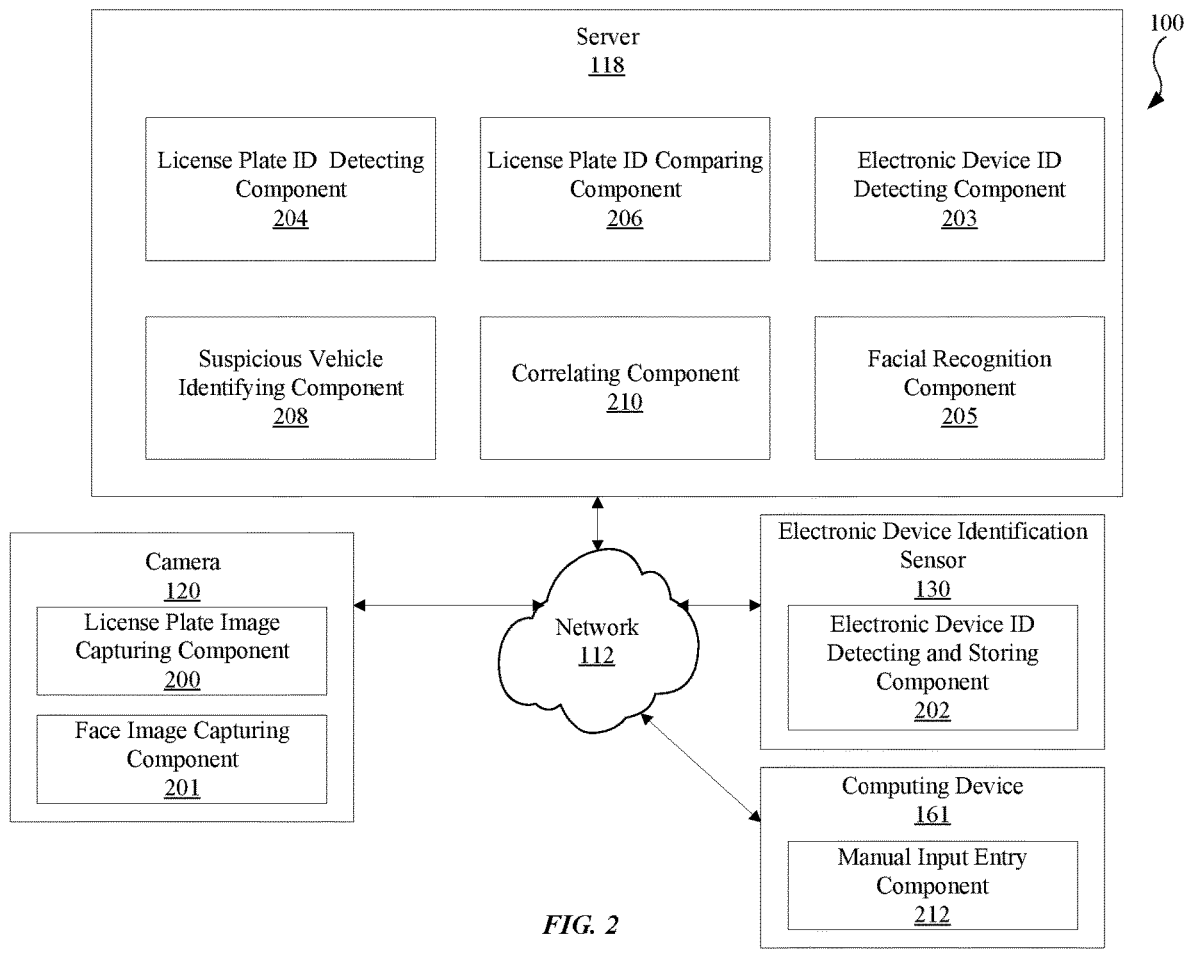
FIG. 2 illustrates details pertaining to various components of the illustrative system architecture of FIG. 1, according to certain embodiments of this disclosure.

FIG. 2 illustrates details pertaining to various components of the illustrative system architecture 100 of FIG. 1, according to certain embodiments of this disclosure. For example, the camera 120 includes an image capturing component 200; the electronic device identification sensor 130 includes an electronic device ID detecting and storing component 202; the server 118 includes a license plate ID detecting component 204, a license plate ID comparing component 206, a suspicious vehicle identifying component 208, and a correlating component 210. In some embodiments, the components 204, 206, 208, and 210 may be included in the computing device 102 executing the client application 104. Each of the components 200, 202, 204, 206, 208, and 210 may be implemented in computer instructions stored on one or more memory devices of their respective device and executed by one or more processors of their respective device.

With regards to the image capturing component 200, the component 200 may be configured to capture a set of images 123 within a license plate detection zone 122. At least some of the captured images 123 may represent license plates of a set of vehicles 126 appearing within the field of view of the cameras 120. The image capturing component 200 may configure one or more camera properties (e.g., zoom, focus, etc.) to obtain a clear image of the license plates. The image capturing component 200 may implement various techniques to extract the license plate ID from the images 123, or the image capturing component 200 may transmit the set of images 123, without analyzing the images 123, to the server 118 via the network 112.

With regards to the electronic device ID detecting and storing component 202, the component 202 may be configured to detect and store a set of electronic device IDs 133 of electronic devices located within one or more electronic device detection zones 132. The electronic device ID detecting and storing component 202 may detect a WiFi signal, cellular signal, and/or a Bluetooth signal from the electronic device and be capable of obtaining the WiFi MAC address, cellular MAC address, and/or Bluetooth MAC address of the electronic device from the signal. The electronic device IDs 133 may be stored locally in memory on the electronic device identification sensor 130, and/or transmitted to the server 118 and/or the computing device 102 via the network 112.

With regards to the license plate ID detecting component 204, the component 204 may be configured to detect, using the set of images 123, a license plate ID of a vehicle 126. The license plate ID detecting component 204 may perform optical character recognition (OCR), or any suitable identifier/text extraction technique, on the set of images 123 to detect the license plate IDs.

With regards to the license plate ID comparing component 206, the component 206 may be configured to compare the license plate ID of the vehicle to a trusted vehicle license plate ID database 117. The license plate ID comparing component 206 may compare the license plate ID with each trusted license plate ID in the trusted vehicle license plate ID database 117.

With regards to the suspicious vehicle identifying component 208, the component 208 may identify the vehicle 126 as a suspicious vehicle 126, the identification based at least in part on the comparison of the license plate ID of the vehicle 126 to the trusted vehicle license plate ID database 117. If there is not a trusted license plate ID that matches the license plate ID of the vehicle 126, then the suspicious vehicle identifying component 208 may identify the vehicle as a suspicious vehicle.

With regards to the correlating component 210, the component 210 may be configured to correlate the license plate ID of the vehicle 126 with at least one of the set of stored electronic device IDs 133. Correlating the license plate ID of the vehicle 126 with at least one of the set of stored electronic device IDs 133 may include comparing one or more time stamps of the set of captured images 123 with one or more time stamps of the set of stored electronic device IDs 133. Also, correlating the license plate ID of the vehicle 126 with at least one of the set of stored electronic device IDs 133 may include analyzing at least one of: (i) at least one strength of signal associated with at least one of the set of stored electronic device IDs 133, and (ii) at least one visually estimated distance of at least one vehicle 126 associated with at least one of the set of stored images 123.

FIG. 3 illustrates an example method 300 for monitoring vehicle traffic, according to certain embodiments of this disclosure. The method 300 may be performed by processing logic that may include hardware (circuitry, dedicated logic, etc.), firmware, software, or a combination of both. The method 300 and/or each of their individual functions, subroutines, or operations may be performed by one or more processors of one or more of the devices in FIG. 1 (e.g., computing device 102, cloud-based computing system 116 including servers 118, cameras 120, electronic device identification sensors 130) implementing the method 300. For example, a computing system may refer to the computing device 102 or the cloud-based computing system 116. The method 300 may be implemented as computer instructions that, when executed by a processing device, execute the operations. In certain implementations, the method 300 may be performed by a single processing thread. Alternatively, the method 300 may be performed by two or more processing threads, each thread implementing one or more individual functions, routines, subroutines, or operations of the method 300.

At block 302, a set of images 123 may be captured, using at least one camera 120, within a license plate detection zone 122. At least some of the set of images 123 may represent license plates of a set of vehicles 126 appearing within the camera's field of view. One or more camera properties (e.g., zoomed in, focused, etc.) may be configured to enable the at least one camera 120 to obtain clear images 123 of the license plates.

At block 304, a set of electronic device identifiers 133 of electronic devices 140 located within one or more electronic device detection zones 132 may be detected and stored using an electronic device identification sensor 130. In some embodiments, the electronic device identification sensor 130 may include at least one of a WiFi signal detection device, cellular signal detection device, or a Bluetooth signal detection device. In some embodiments, the set of electronic device identifiers 133 may include at least one of a Bluetooth MAC address, cellular MAC address, or a WiFi MAC address. In some embodiments, at least one of the set of stored electronic device identifiers 133 may be compared with a list of trusted device identifiers.

At block 306, a license plate ID of a vehicle 126 may be detected using the set of images 123. The images 123 may be filtered, rendered, and/or processed in any suitable manner such that the license plate IDs may be clearly detected using the set of images 123. In some embodiments, object character recognition (OCR) may be used to detect the license plate IDs in the set of images 123. The OCR may electronically convert each image in the set of images 123 of the license plate IDs into computer-encoded license plate IDs that may be stored and/or used for comparison.

In some embodiments, a face of the individual 142 may be detected by a camera 120 in the facial detection zone 150. An image 123 may be captured by the camera 120 and facial recognition may be performed on the image to detect the face of the individual. The detected face and/or the image 123 may be transmitted to the cloud-based computing system 116 and/or the computing device 102.

At block 308, the license plate ID of the vehicle 126 may be compared to a database of trusted vehicle license plate IDs. In some embodiments, the database 117 of trusted vehicle license plate IDs may be populated at least in part by adding license plate IDs of vehicles 126 that commonly enter the license plate detection zone 122 to the database 117 of trusted vehicle license plate IDs. In some embodiments, the database 117 of trusted vehicle license plate IDs may be populated at least in part by manual entry of license plate IDs associated with vehicles 126 trusted to be within the license plate detection zone 122. For example, the trusted vehicles may belong to the neighbors, family members of the neighbors, friends of the neighbors, law enforcement, and so forth.

At block 310, the vehicle may be identified as a suspicious vehicle 126. The identification may be based at least in part on the comparison of the license plate ID of the vehicle to the database 117 of trusted vehicle license plate IDs. For example, if the license plate ID is not matched with a trusted license plate ID stored in the database 117 of trusted vehicle license plate IDs, then the vehicle associated with the license plate ID may be identified as a suspicious vehicle 126.

At block 312, the license plate ID of the vehicle 126 may be correlated with at least one of the set of stored electronic device identifiers 133. In some embodiments, the face of the individual 142 may also be correlated with the license plate ID and the at least one of the set of stored electronic device identifiers 133. In some embodiments, at least one personal identification database 119 may be accessed. In some embodiments, correlating the license plate ID of the vehicle 126 with at least one of the set of stored electronic device identifiers 133 may include comparing one or more time stamps of the set of captured images 123 with one or more time stamps of the set of stored electronic device identifiers 133. In some embodiments, correlating the license plate ID of the vehicle 126 with the at least one of the set of stored electronic device identifiers 133 may include analyzing at least one of (i) at least one strength of signal associated with at least one of the set of stored electronic device identifiers 133, and (ii) at least one visually estimated distance of at least one vehicle associated with at least one of the set of stored images 123.

Personal identification information of at least one suspicious individual may be retrieved from the at least one personal identification database 119 by correlating information of the personal identification database 119 with the license plate ID of the vehicle 126 or at least one of the set of electronic device identifiers 133 correlated with the license plate ID of the vehicle 126. The personal identification information may also be obtained using a face detected by the camera 120 to obtain the electronic device ID 133 and/or the license plate ID correlated with the face. The personal identification information may include one or more of a name, a phone number, an email address, a residential address, a Bluetooth MAC address, a cellular MAC address, a WiFi MAC address, whether the suspicious individual is on a crime watch list, a criminal record of the suspicious individual, and so forth.

In some embodiments, a user interface may be displayed on one or more computing devices 102 of one or more neighbors when the one or more computing devices are executing the client application 104, and the user interface may present a notification or alert. In some embodiments, the computing device 102 may present a push notification on the display screen and the user may provide user input (e.g., swipe the push notification) to expand the notification on the user interface to a larger portion of the display screen. The alert or notification may indicate that there is a suspicious vehicle 126 identified within the zones 122 and/or 132 and may provide information pertaining to the vehicle 126 (e.g., make, model, color, license plate ID, etc.) and personal identification information of the suspicious individual (e.g., name, phone number, email address, Bluetooth MAC address, cellular MAC address, WiFi MAC address, whether the individual is on a crime watch list, whether the individual has a criminal record, etc.).

Further, the user interface may present one or more options to perform preventative actions. The preventative actions may include contacting an electronic device 140 of the suspicious individual using the personal identification information. For example, a user may use a computing device 102 to transmit a communication (e.g., at least one text message, phone call, email, or some combination thereof) to the suspicious individual using the retried personal information.

In addition, the preventative actions may also include notifying law enforcement of the suspicious vehicle and/or individual. This preventative action may be available if it is determined that the suspicious individual is on a crime watch list. A suspicious vehicle profile may be created. The suspicious vehicle profile may include the license plate ID of the suspicious vehicle and/or the at least one correlated electronic device identifiers (e.g., Bluetooth MAC address, WiFi MAC address). The user may select the notify law enforcement option on the user interface and the computing device 102 of the user may transmit the suspicious vehicle profile to another computing device 102 of a law enforcement entity that may be logged into the client application 104 using a law enforcement account.

In some embodiments, the preventative action may include activating an alarm upon detection of the suspicious vehicle 126. The alarm may be located in the neighborhood, for example, on a light pole, a tree, a pole, a sign, a mailbox, a fence, or the like. The alarm may be included in the computing device 102 of a user (e.g., a neighbor) using the client application. The alarm may include auditory (e.g., a message about the suspect, a sound, etc.), visual (e.g., flash certain colors of lights), and/or haptic (e.g., vibrations) elements. In some embodiments, the severity of the alarm may change the pattern of auditory, visual, and/or haptic elements based on what kind of crimes the suspicious individual has committed, whether the suspicious vehicle 126 is stolen, whether the suspicious vehicle 126 matches a description of a vehicle involved in an Amber alert, and so forth.

Figure 4:
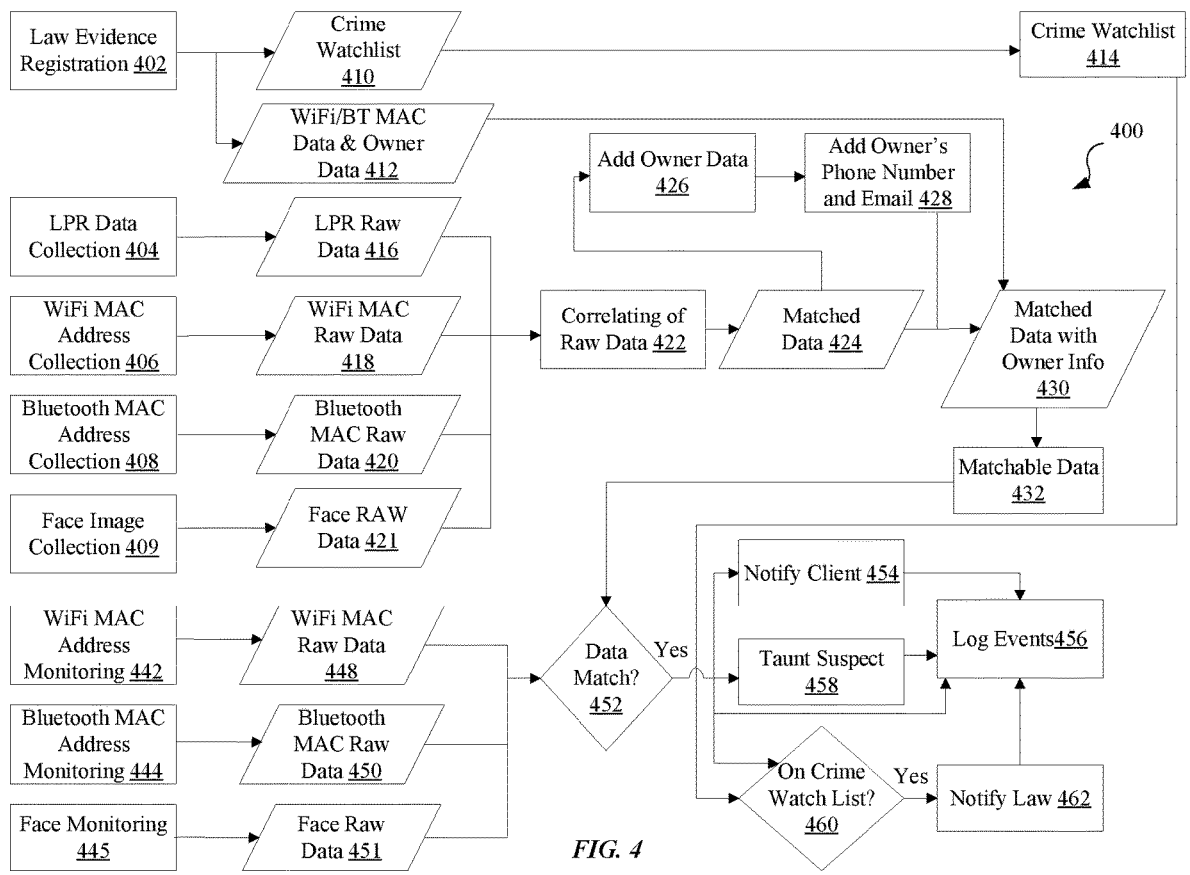
FIG. 4 illustrates another example method for monitoring vehicle traffic, according to certain embodiments of this disclosure.

FIG. 4 illustrates another example method 400 for monitoring vehicle traffic, according to certain embodiments of this disclosure. Method 400 includes operations performed by one or more processing devices of one or more devices in FIG. 1 (e.g., computing device 102, cloud-based computing system 116 including servers 118, cameras 120, electronic device identification sensors 130) implementing the method 400. In some embodiments, one or more operations of the method 400 are implemented in computer instructions that, when executed by a processing device, execute the operations of the steps. The method 400 may be performed in the same or a similar manner as described above in regards to method 300.

The method 400 may begin with a setup phase where various steps 402, 404, 406, and/or 408 are performed to register data that may be used to determine whether a vehicle and/or individual is suspicious. For example, at block 402, law evidence may be registered. The law evidence may be obtained from a system of a law enforcement agency. For example, an application programming interface (API) of the law enforcement system may be exposed and API operations may be executed to obtain the law evidence. The law evidence may indicate whether a person is on a crime watch list 410, whether the person has a warrant, whether person has a criminal record, and/or the WiFi/Bluetooth MAC data (address)/cellular data of electronic devices involved in incidents, as well as the owner information 412 of the electronic devices. The crime watch list 410 information may be used to store crime watch list 414 in a database (e.g., personal identification database 119).

At block 404, license plate registration (LPR) data may be collected using the one or more cameras 120 in the license plate detection zones 122 as LPR raw data 416. The LPR raw data 416 may be used to obtain vehicle owner information (e.g., name, address, phone number, email address) and vehicle information (e.g., license plate ID, make, model, color, year, etc.). For example, the LPR raw data 416 may include at least the license plate ID, which may be used to search the Department of Motor Vehicles (DMV) to obtain the vehicle owner information and/or vehicle information. In some instances, the LPR raw data 416 may be collected from manual entry. At block 406, WiFi MAC addresses may be collected from various sources as WiFi MAC raw data 418. For example, the WiFi MAC raw data 418 may be collected from the electronic device identification sensors 130 in the electronic device detection zones 132. In some instances, trusted WiFi MAC addresses may be manually obtained from certain people owning electronic devices in an area covered by the electronic device detection zones 132 and stored in a database (e.g., personal identification database 119). In some embodiments, cellular raw data (e.g., cellular MAC addresses) may be collected from electronic device identification sensors 130. At block 408, Bluetooth MAC addresses may be collected from various sources as raw data 420. For example, the Bluetooth MAC raw data 418 may be collected from the electronic device identification sensors 130 in the electronic device detection zones 132. In some instances, trusted Bluetooth MAC addresses may be manually obtained from certain people owning electronic devices in an area covered by the electronic device detection zones 132 and stored in a database (e.g., personal identification database 119). In some embodiments, the Bluetooth MAC addresses may be collected from the electronic device identification sensors 130 at the electronic device detection zones 132. At block 409, face images may be collected by the one or more cameras 120 in the facial detection zones 150. Facial recognition may be performed to detect and recognize faces in the face images.

At block 422, the LPR raw data 416, the WiFi MAC raw data 418, the Bluetooth MAC raw data 420, the cellular raw data, and/or the face raw data 451 may be correlated or paired to generate matched data 424. That is, the data from license plate ID detection, LPR systems, personal electronic device detection, and/or facial information may be combined to generate matched data 424 and stored in the database 117 and/or 119. In some embodiments, the license plate IDs are compared to the database 119 of trusted vehicle license plate IDs to determine whether the detected license plate ID is in the trusted vehicle license plate ID database 119. If not, the vehicle 126 may be identified as a suspicious vehicle and the license plate ID of the vehicle may be correlated with at least one of the set of stored electronic device IDs 133. This may result in creation of a database of detected electronic device identifiers 133 correlated with license plate IDs and facial information of individuals. Any unpaired data may be discarded after unsuccessful pairing.

At block 426, owner data of the electronic devices and/or vehicle may be added to the matched data 424. The owner data may include an owner ID, and/or name, address, and the like. Further, at block 428, owner's phone number and email may be added to the matched data. In addition, WiFi/Bluetooth MAC/cellular data and owner data 412 from the law evidence may be included with the matched data 424 and the personal information of the owner to generate matched data with owner information 430. Accordingly, the owner ID may be associated with combined personal information (e.g., name, address, phone number, email, etc.), vehicle information (e.g., license plate ID, make, model, color, year, vehicle owner information, etc.), and electronic device IDs 133 (e.g., WiFi MAC address, Bluetooth MAC adder). At block 432, the matched data with owner information 430 may be further processed (e.g., formatted, edited, etc.) to generate matchable data. This may conclude the setup phase.

Next, the method 400 may include a monitoring phase. During this phase, the method 400 may include monitoring steps 442, 444, and 445. At block 442, WiFi MAC address monitoring may include one or more electronic device identification sensors 130 detecting and storing a set of WiFi MAC addresses as WiFi MAC raw data 448. In some embodiments, cellular signal monitoring may include one or more electronic device identification sensors 130 detecting and storing a set of cellular MAC addresses as cellular raw data. At block 444, Bluetooth MAC address monitoring may include one or more electronic device identification sensors 130 detecting and storing a set of Bluetooth MAC addresses as Bluetooth MAC raw data 450. At block 451, face monitoring may include the one or more cameras 120 capturing face images and recognizing faces in the face images as face raw data 451. The WiFi MAC raw data 448, Bluetooth MAC raw data 450, and/or face raw data 451 may be compared to matchable data 432 at decision block 452.

At block 452, the electronic device IDs 133 and/or faces detected by the electronic device identification sensors 130 and/or the cameras 120 may be compared to the matchable data 432. The matchable data 432 may include personal identification information that is retrieved from at least the personal identification database 117. That is, the detected electronic device IDs 133 and/or faces may be compared to the database 117 and/or 119 to find any correlation of the detected electronic device IDs 133 and/or faces with license plate IDs.

If there is a matching electronic device ID to the detected electronic device ID and/or a matching face to the detected face, and there is a correlation with a license plate ID in the database 117 and/or 119, then a suspicious vehicle 126/individual 143 may be detected. At block 456, the detected match event may be logged. At block 456, the user interface of the client application 104 executing on the computing device 102 may present an alert of the suspicious vehicle 126/individual 142. At block 456, the detected notification event may be logged. At block 458, the electronic device 140 of the suspicious individual 142 may be notified that his presence is known (e.g., taunted). At block 456, the taunting event may be logged.

At decision block 460, the crime watch list 414 may be used to determine if the identified individual 142 is on the crime watch list 414 using the individual's personal information. If the individual 142 is on the watch list 414, then at block 462, the appropriate law enforcement agency may be notified. At block 456, the law enforcement agency notification event may be logged.

Figure 5:
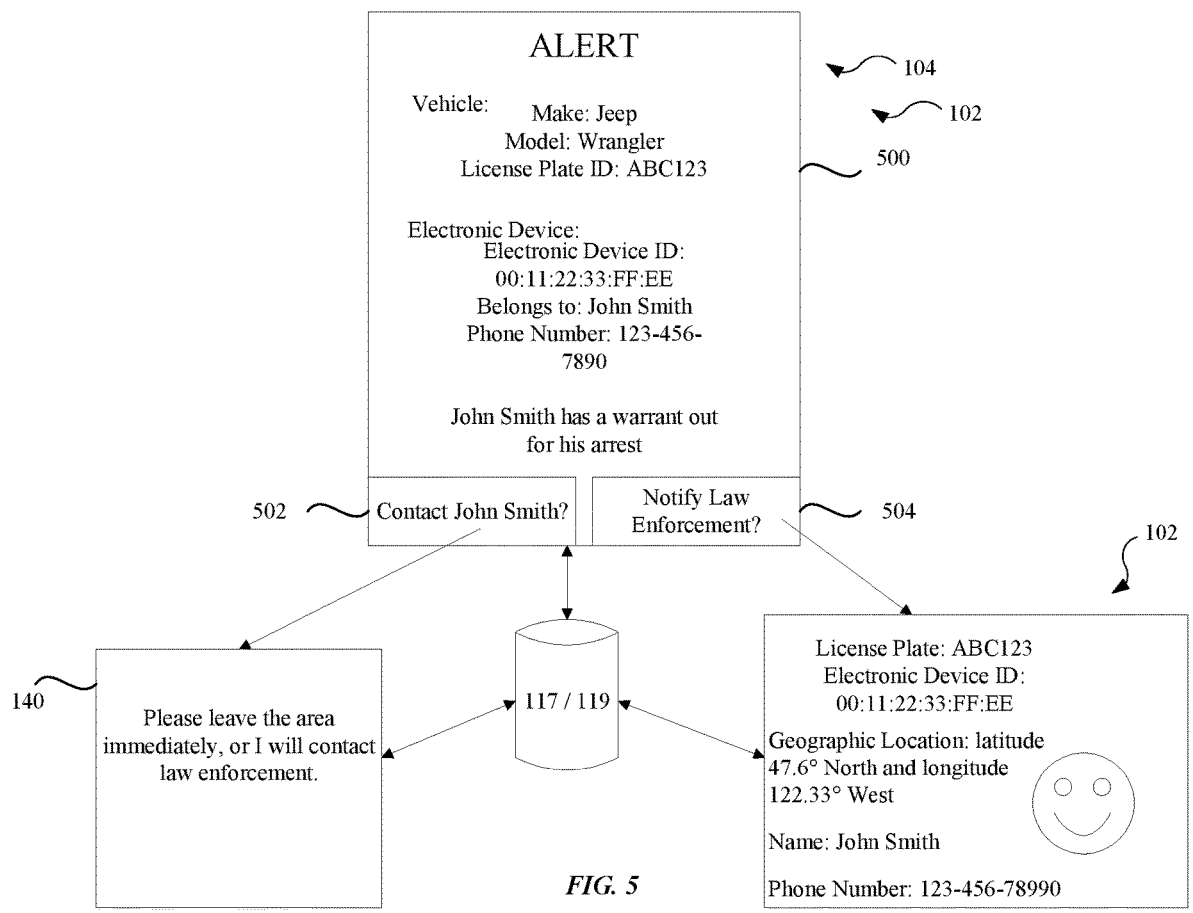
FIG. 5 illustrates example use interfaces presented on computing devices during monitoring vehicle traffic, according to certain embodiments of this disclosure.

FIG. 5 illustrates example use interfaces presented on computing devices during monitoring vehicle traffic, according to certain embodiments of this disclosure. It should be noted that a user interface 500 may present vehicle information and electronic device information in a single user interface. When a suspicious vehicle 126/individual 142 is detected based on the vehicle license plate ID and/or the electronic device IDs 133, a notification may be presented on the user interface 500 of the client application 104 executing on the computing device 102 of a user (e.g., homeowner, neighbor, interested citizen). As depicted, the notification includes an alert displaying vehicle information and electronic device information. The vehicle information includes the "Make: Jeep", "Model: Wrangler", "License Plate ID: ABC123". The electronic device information includes "Electronic Device ID: 00:11:22:33:FF:EE", "Belongs to: John Smith", "Phone Number: 123-456-7890". Further, the user interface 500 presents that the owner has a warrant out for his arrest. The notification event may be logged in the database 117/119 or any suitable database of the system 100.

The user interface 500 includes various preventative action options represented by user interface element 502 and 504. For example, user interface element 502 may be associated with contacting the detected suspicious individual 142 directly. Upon selection of the user interface element 502, the user may be able to send a text message to the electronic device 140 of the suspicious individual 142. For example, the text message may read "Please leave the area immediately, or I will contact law enforcement." However, any suitable message may be sent. The message/taunting event may be logged in the database 117/119 or any suitable database of the system 100.

Since the suspicious individual 142 has a warrant out for his arrest and/or is on a crime watch list, the user interface element 504 may be displayed that provides the option to notify law enforcement. Upon selection of the user interface element 504, a notification may be transmitted to a computing device 102 of a law enforcement agency. The notification may include vehicle information (e.g., "License Plate ID: ABC123"), electronic device information (e.g., "Electronic Device ID: 00:11:22:33:FF:EE"), as well as location of the detection (e.g., "Geographic Location: latitude 47.6° North and longitude 122.33° West"), and personal information ("Name: John Smith", "Phone Number: 123-456-7890", a face of the individual 142). The law enforcement agency event may be logged in the database 117/119 or any suitable database of the system 100.

Below are example data tables that may be used to implement the system and method for monitoring vehicle traffic disclosed herein. The data tables may include: Client and ID Tables (log ID, loginAttempts, clientUser, lawUser, billing), Data Site Info (monitoredSites, dataSites, dataGroups), Raw Collection Data (rawWiFiDataFound, rawBTDataFound, rawLPRDataFound, pairedData), Monitor Data Raw & Matched (monWiFiDataDetected, monBTDataDetected, monWiFiDataMatched, monBTDataMatched), Subject Data (subjectMatch, subjectInfo, subjectLastSeen, criminalWatchList), Notification Logs (subNotifyLog, subNotifyReplyLog, clientNotifyLog).

TABLE 1

| loginID |
|---|
| loginID |
| username |
| clientID |
| idType |
| rights |
| email |
| password |
| lastLogin |

Table 1: log ID is used for login ID/passwords, authentication and password resets

TABLE 2

| loginAttempts |
|---|
| loginAttempts |
| clientID |
| username |
| timeStamp |
| IP |
| wifiRSSI |

TABLE 2-continued loginAttempts
loginAttempts wifiVendor
wifiLocDet
scanInt

Table 2: loginAttempts logs the number of times logins were attempted for both successes and failures

TABLE 3 clientUser
clientUser clientID
username
firstName
lastName
phone1
phone2
phone3
email1
email2
email3
txt1
txt2
txt3
lastUserName
dataIDs
lawID
monID Table 3: clientUser includes information for each user.

TABLE 4 lawUser
lawUser lawUserName
lawID
lawType
lawPrecinct
lawDept
firstName
lastName
phone1
phone2
phone3
email1
email2
email3
txt1
txt2
Txt3
alertType Table 4: lawUser includes information for law enforcement personnel wanting to be notified of suspicious vehicles 126/individuals 142.

TABLE 5 billing
billing clientID
username
package
numMons
options
cardType
cardName
cardAddr1

TABLE 5-continued billing
billing cardAddr2
cardCity
cardState
cardZIP
cardNum
cardExp
cardID Table 5: billing may be used for third-party billing.

TABLE 6 monitoredSites
monitoredSites monID
monGroupID
clientID
monAddr1
monAddr2
monCity
monState
monZIP
monCountry Table 6: monitoredSites includes information for WiFi/Bluetooth monitoring for detection, among other things.

TABLE 7 dataSites
dataSites dataID
dataAddr1
dataAddr2
dataCity
dataState
dataZIP
dataCountry
groupNum
hwModel
hwSerialNum
softVersion
installDate
devLoc
notes Table 7: dataSites includes information for WiFi/Bluetooth/License Plate Registration detection sites. These sites may supply data to databases, among other things.

TABLE 8 dataGroups
dataGroups groupID
groupName
groupLocation
groupAddr1
groupAddr2
groupCity
groupState
groupZIP
groupCountry
info Table 8: dataGroups may group data groups and monitored sites. Groupings such as Homeowner Associations, neighborhoods, etc.

TABLE 9

| rawWiFiDataFound |
| --- |
| rawWiFiDataFound |
| timeStamp |
| wifiSync |
| wifiMAC |
| wifiDevice |
| wifiRSSI |
| wifiVendor |
| wifiLocDet |
| scanInt |

Table 9: rawWiFiDataFound includes raw data dump for WiFi from detection sites used to look for matches.

TABLE 10

| rawBTDataFound |
| --- |
| rawBTDataFound |
| timeStamp |
| btSync |
| btMAC |
| btName |
| btRSSI |
| btVendor |
| btCOD |
| btLocDet |
| scanInt |

Table 10: rawBTDataFound includes raw data dump for Bluetooth from detection sites used to look for matches.

TABLE 11

| rawLPRDataFound | |
| --- | --- |
| rawLPRDataFound | |
| timeStamp | lprPic3 |
| lprPlate | lprPic4 |
| lprState | lprPic5 |
| lpreMake | lprPic6 |
| lprModel | lprPic7 |
| lprPlatePic | lprPic8 |
| lprPic1 | lprLocDet |
| lprPic2 | scanInt |

Table 11: rawLPRDataFound may include raw LPR data from detection sites used to look for matches.

TABLE 12

| pairedData | |
| --- | --- |
| pairedData | |
| pairedID | btCOD |
| timeStamp | wifiLocDet |
| lprTimeStamp | btLocDet |
| wifiTimeStamp | lprLocDet |
| btTimeStamp | lprPlatePic |
| lprPlate | lprPic1 |
| lprState | lprPic2 |
| lprMake | lprPic3 |
| lprModel | lprPic4 |
| wifiMAC | lprPic5 |
| wifiDevice | lprPic6 |
| wifiVendor | lprPic7 |
| btMAC | lprPic8 |
| btName | subjectID |
| btVendor | |

Table 12: pairedData includes matched data that may be the correlation between vehicle information (e.g., license plate IDs) and electronic device IDs 133.

TABLE 13

| monWiFiDataDetected |
| --- |
| monWiFiDataDetected |
| timestamp |
| wifiSync |
| wifiMAC |
| wifiDevice |
| wifiRSSI |
| wifiVendor |
| wifiMonLoc |

Table 13: monWiFiDataDetected logs of any MAC address data detected before matching for WiFi.

TABLE 14

| monBTDataDetected |
| --- |
| monBTDataDetected |
| timestamp |
| btSync |
| btMAC |
| btName |
| btRSSI |
| btVendor |
| btCOD |

Table 14: monBTDataDetected logs of any MAC address data detected before matching for Bluetooth.

TABLE 15

| monWiFiDataMatched |
| --- |
| monWiFiDataMatched |
| pairedID |
| timestamp |
| wifiSync |
| wifiMAC |
| wifiDevice |
| wifiRSSI |
| wifiVendor |
| wifiMonLoc |

Table 15: monWiFiDataMatched logs of any matches monitored sites find on the database for WiFi.

TABLE 16

| monBTDataMatched |
| --- |
| monBTDataMatched |
| pairedID |
| timestamp |
| btSync |
| btMAC |
| btName |
| btRSSI |
| btVendor |
| btCOD |
| btMonLoc |

Table 16: monBTDataMatched logs of any matches monitored sites find on the database for Bluetooth.

TABLE 17 subjectMatch
subjectMatch subjectID
subjectWiFiMAC
subjectBtMAC
timeStamp

Table 17: subjectMatch includes a number of times subject detected in monitored sites and data sites.

TABLE 18 subjectInfo
subjectInfo

| | |
|---|---|
| subjectID | subPhone1 |
| subFirstName | subPhone2 |
| subLastName | subPhone3 |
| subDOB | subPhone4 |
| subAddr1 | subPhone5 |
| subAddr2 | subPhone6 |
| subCity | subTxt1 |
| subState | subTxt2 |
| subZIP | subTxt3 |

Table 18: subjectInfo includes information obtained for owner of license vehicle.

TABLE 19 subjectLastSeen
subjectLastSeen pairedID
timestamp
subjectID
locID
monID

Table 19: subjectLastSeen includes locations where subject was seen with a timestamp.

TABLE 20 criminalWatchList
criminalWatchList subjectID
crimeType
dateCommitted
notifyIfDetected
status Table 20: criminalWatchList includes a criminal watch list that is compared to subjects/individuals 142 to determine if they are a criminal and who to notify if found.

TABLE 21 subNotifyLog
subNotifyLog timestamp
clientID
subjectID
subPhoneTexted
msgSent
msgStatus Table 21: subNotifyLog includes notifications sent to the subject to discourage crime.

TABLE 22 subNotifyReplyLog
subNotifyReplyLog timestamp
clientID
subjectID
subPhoneTexted
msgReceived Table 22: subNotifyReplyLog includes any replies from the subject after notification.

TABLE 23 clientNotifyLog
clientNotifyLog timestamp
clientID
msgSent
msgStatus
msgType
numSent
emailSent Table 23: clientNotifyLog includes log of notification attempts to the client (e.g., computing device 102 of a user).

Figure 6:
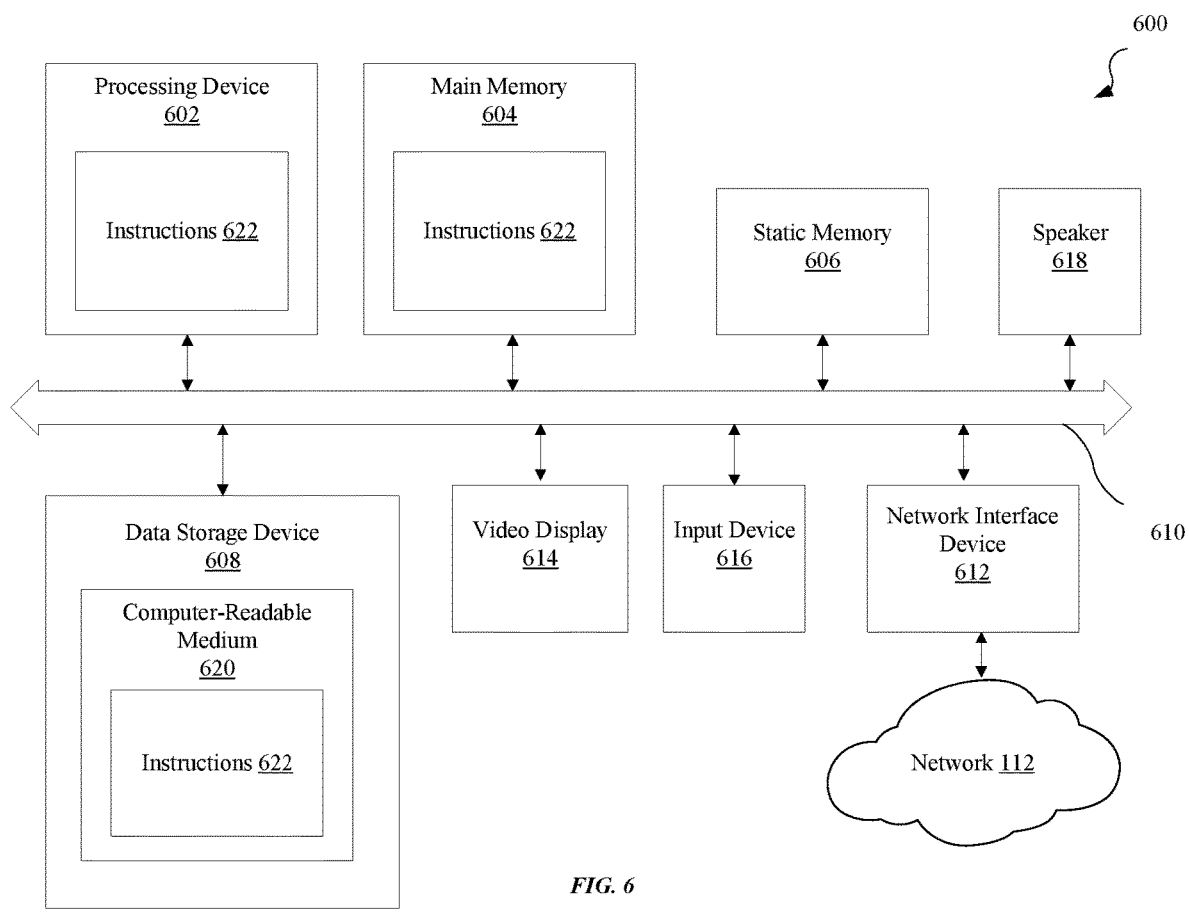
FIG. 6 illustrates an example computer system according to certain embodiments of this disclosure.

FIG. 6 illustrates example computer system 600 which can perform any one or more of the methods described herein, in accordance with one or more aspects of the present disclosure. In one example, computer system 600 may correspond to the computing device 102, server 118 of the cloud-based computing system 116, the cameras 120, and/or the electronic device identification sensors 130 of FIG. 1. The computer system 600 may be capable of executing client application 104 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a wearable (e.g., wristband), a set-top box (STB), a personal Digital Assistant (PDA), a mobile phone, a camera, a video camera, an electronic device identification sensor, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 600 includes a processing device 602, a main memory 604 (e.g., read-only memory (ROM), flash memory, dynamic random access memory (DRAM) such as synchronous DRAM (SDRAM)), a static memory 606 (e.g., solid state drive (SSD), flash memory, static random access memory (SRAM)), and a data storage device 608, which communicate with each other via a bus 610.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for performing any of the operations and steps discussed herein.

The computer system 600 may further include a network interface device 612. The computer system 600 also may include a video display 614 (e.g., a liquid crystal display (LCD) or a cathode ray tube (CRT)), one or more input devices 616 (e.g., a keyboard and/or a mouse), and one or more speakers 618 (e.g., a speaker). In one illustrative example, the video display 614 and the input device(s) 616 may be combined into a single component or device (e.g., an LCD touch screen).

The data storage device 616 may include a computer-readable medium 620 on which the instructions 622 (e.g., implementing control system, user portal, clinical portal, and/or any functions performed by any device and/or component depicted in the FIGURES and described herein) embodying any one or more of the methodologies or functions described herein is stored. The instructions 622 may also reside, completely or at least partially, within the main memory 604 and/or within the processing device 602 during execution thereof by the computer system 600. As such, the main memory 604 and the processing device 602 also constitute computer-readable media. The instructions 622 may further be transmitted or received over a network via the network interface device 612.

While the computer-readable storage medium 620 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A system for monitoring vehicle traffic comprising:
one or more non-transitory computer-readable storage media storing computer-executable instructions that, when executed by one or more processors, cause a computing system to:
detect, using a plurality of images, a license plate ID of a vehicle;
compare the license plate ID of the vehicle to a database of trusted vehicle license plate IDs;
identify the vehicle as a suspicious vehicle, the identification based at least in part on the comparison of the license plate ID of the vehicle to the database of trusted vehicle license plate IDs; and
correlate the license plate ID of the vehicle with at least one of the plurality of stored electronic device identifiers,
wherein the computer-executable instructions further cause the computing system to:
access at least one personal identification database; and
retrieve personal identification information of at least one suspicious individual by correlating information of the personal identification database with the license plate ID of the vehicle or at least one of a plurality of electronic device identifiers correlated with the license plate ID of the vehicle.

2. The system of claim 1, wherein the computer-executable instructions further cause the computing system to transmit a communication to the suspicious individual using the retrieved personal information.

3. The system of claim 1, wherein the computer-executable instructions further cause the computing system to populate the database of trusted vehicle license plate IDs at least in part by adding license plate IDs of vehicles that commonly enter the license plate detection zone to the database of trusted vehicle license plate IDs.

4. The system of claim 1, wherein the database of trusted vehicles is populated at least in part by manual entry of license plate IDs associated with vehicles trusted to be within the license plate detection zone.

5. The system of claim 1, wherein the computer-executable instructions further cause the computing system to create a suspicious vehicle profile, the suspicious vehicle profile comprising the license plate ID of the vehicle and the at least one correlated electronic device identifiers.

6. The system of claim 5, wherein the computer-executable instructions further cause the computing system to transmit the suspicious vehicle profile to a law enforcement entity.

7. The system of claim 1, wherein the computer-executable instructions further cause the computing system to: compare at least one of the plurality of stored electronic device identifiers with a list of trusted device identifiers.

8. The system of claim 1, wherein at least one of the plurality of stored electronic device identifiers comprises a MAC address.

9. The system of claim 1, wherein correlating the license plate ID of the vehicle with at least one of the plurality of stored electronic device identifiers comprises comparing one or more time stamps of the plurality of captured images with one or more time stamps of the plurality of stored electronic device identifiers.

10. The system of claim 1, wherein correlating the license plate ID of the vehicle with the at least one of the plurality of stored electronic device identifiers comprises analyzing at least one of:
at least one strength of signal associated with at least one of the plurality of stored electronic device identifiers; and
at least one visually estimated distance of at least one vehicle associated with at least one of the plurality of stored images.

11. The system of claim 1, further comprising a second camera positioned to capture a plurality of second images within a facial detection zone, at least some of the plurality of second images representing faces of a plurality of individuals appearing within the second camera's field of view,
wherein the computer-executable instructions further cause the computing system to:
detect, using the plurality of second images, a face of an individual;
correlate the face of the individual with the license plate ID of the vehicle and the at least one of the plurality of stored electronic device identifiers.

12. A method comprising:
- detecting, using a plurality of images, a license plate ID of a vehicle;
- comparing the license plate ID of the vehicle to a database of trusted vehicle license plate IDs;
- identifying the vehicle as a suspicious vehicle, the identification based at least in part on the comparison of the license plate ID of the vehicle to the database of trusted vehicle license plate IDs;
- correlating the license plate ID of the vehicle with at least one of the plurality of stored electronic device identifiers,
- accessing at least one personal identification database; and
- retrieving personal identification information of at least one suspicious individual by correlating information of the personal identification database with the license plate ID of the vehicle or at least one of a plurality of electronic device identifiers correlated with the license plate ID of the vehicle.

13. The method of claim 12, further comprising transmitting a communication to the suspicious individual using the retrieved personal information.

14. The method of claim 13, wherein the transmitted message comprises at least one text message.

15. The method of claim 12, further comprising populating the database of trusted vehicle license place IDs at least in part by adding license plate IDs of vehicles that commonly enter the license plate detection zone to the database of trusted vehicle license plate IDs.

16. The method of claim 12, further comprising populating the database of trusted vehicle license plate IDs at least in part by manually entering license plate IDs associated with vehicles trusted to be within the license plate detection zone.

17. The method of claim 12, further comprising activating an alarm upon detection of a suspicious vehicle.

18. The method of claim 12, further comprising transmitting to a law enforcement agency one or more of the license plate ID of the vehicle or the at least one correlated electronic device identifiers.

19. The method of claim 12, wherein the plurality of images are captured by at least one camera positioned within a license plate detection zone, at least some of the captured images representing license plates of a plurality of vehicles appearing within the camera's field of view.

20. The method of claim 12, wherein the plurality of electronic device identifiers of electronic devices are detected by at least one electronic device identification sensor located within one or more electronic device detection zones.

* * * * *